United States Patent [19]

Ishibashi

[11] 4,288,673

[45] Sep. 8, 1981

[54] HIGH FREQUENCY INDUCTION HEATING APPARATUS

[75] Inventor: Kazuhisa Ishibashi, Tokyo, Japan

[73] Assignee: Toyo Seikan Kaisha, Ltd., Tokyo, Japan

[21] Appl. No.: 47,646

[22] Filed: Jun. 11, 1979

[30] Foreign Application Priority Data

Jul. 12, 1978 [JP] Japan .................................. 53-84920
Jul. 12, 1978 [JP] Japan .................................. 53-84921

[51] Int. Cl.$^3$ .............................................. H05B 6/40
[52] U.S. Cl. .............................. 219/10.69; 219/10.79; 219/10.57; 156/380
[58] Field of Search ............... 219/10.69, 10.71, 10.67, 219/10.73, 10.75, 10.79, 10.57, 10.49 R, 10.41, 10.43, 10.53; 156/380, 272, 275, 69; 198/645, 655, 688, 690, 952

[56] References Cited

U.S. PATENT DOCUMENTS

| | | | |
|---|---|---|---|
| 2,439,517 | 4/1948 | Johnson | 219/10.49 R |
| 2,818,483 | 12/1957 | Blume | 219/10.53 X |
| 3,251,976 | 5/1966 | McBrien | 219/10.49 X |
| 3,659,069 | 4/1972 | Balzer et al. | 219/10.79 |
| 3,694,609 | 9/1972 | Kennedy | 219/10.79 |

FOREIGN PATENT DOCUMENTS

4,741,398 10/1972 Japan .......................... 219/10.69 X

OTHER PUBLICATIONS

Basics of Induction Heating, "Mechanical Forces on Coils", vol. I, p. 123 by Tudbury, May 1960.

*Primary Examiner*—Gene Z. Rubinson
*Assistant Examiner*—Philip H. Leung
*Attorney, Agent, or Firm*—Pennie & Edmonds

[57] ABSTRACT

A high frequency induction heating apparatus having a heating station and transport means for moving an article to be heated through the heating station. A pair of high frequency electrical conductors are contained in the heating station and are connected to a source of high frequency electrical current such that high frequency current will flow through the conductors in mutually opposite directions. The conductors are inclined or tapered with respect to the path of movement of the article through the heating station to assure that the complete area of the article facing the conductors is heated during its movement through the station or to vary the temperature gradient of the area facing the conductors. Ferrite cores may be included on the side opposite the conductors from the article to be heated in order to increase heating of particular areas of the article.

4 Claims, 11 Drawing Figures

HIGH FREQUENCY INDUCTION HEATING APPARATUS

TECHNICAL FIELD

The invention relates to a high frequency induction heating apparatus having a heating station and transport means for moving an article such as a metal shell through the heating station. The apparatus includes a pair of high frequency electrical conductors extending in a plane beneath and parallel to the path of movement of the article through the heating station. The conductors are connected to a source of high frequency current such that high frequency electrical current will flow through the conductors in mutually opposite directions. Each of the conductors is inclined or tapered with respect to the path of movement of the article through the heating station. The degree of inclination of the conductors may be uniform along the complete path or may vary along different portions of the path. Ferrite cores may be positioned at different portions of the path on sides of the conductors opposite the article to be heated in order to increase heating of particular areas of the article.

BACKGROUND ART

An induction heating apparatus utilizing high frequency currents over 10 kilohertz has been used in a number of fields including heating of articles that are supplied continuously to the heating apparatus, as for example metal shells that are used to make metal caps for bottles or containers. It is often necessary that the bottom part of a metal shell be heated in order that a resin sheet forming a seal may be affixed to the metal shell to complete it into a metal cap. In such instances, the resin sheet which is to form the seal may comprise vinyl chloride, polyethylene or polypropylene. In order that the sheet may be firmly affixed to the inner bottom surface of the shell, an adhesive primer such as an epoxy is painted onto the shell inner bottom surface and the resin sheet is then attached firmly to the primer after the primer has been heated to a molten state. Ordinarily an adhesive primer will adhere to a resin sheet and to the bottom surface of a metal shell when the bottom surface of the shell has been heated to approximately 100°–200° C. by use of a high frequency induction apparatus. Caps produced by such apparatus include screw caps, crown caps and pilfer-proof caps, but regardless of the cap shape, in almost every instance the resin sheet is affixed to the inner bottom surface of the cap by a primer in order for the sheet to serve as a packing or seal.

In high frequency induction heating apparatus as used heretofore, metal shells are transported through the heating station of the heating apparatus at a fixed speed by a transport means which may take the form of a conveyor or a turntable while heating is provided by heating coils comprising at least one pair of electrical conductors connected to a source of high frequency electrical current so that the flow of current through the conductors is in mutually opposite directions. Each conductor extends parallel to the path of movement of the article to be heated through the heating station. Because the high frequency conductors extend parallel to the path of movement, some areas of the bottom surface of the article facing the conductors remain closer to the conductors than other areas of the surface with the result that the temperature rise along the complete area of the surface of the article facing the conductors is nonuniform. This presents no problem where the movement of the article through the heating station is comparatively slow since the conduction flow of heat from hotter areas to cooler areas of the article will eventually result in uniform heating.

However when the passage of the article through the heating station is comparatively fast as occurs in the production of metal shells utilized to make metal caps, the non-uniform temperature rise presents a problem in that adhesion of the resin sheet to the bottom surface of the shell will be poor in areas where the shell has been insufficiently heated.

It is an object of the present invention to provide for a high frequency induction heating apparatus wherein means are provided to assure even heating over the areas of the surface of articles which require uniform heating.

It is a further object of the invention to provide for heating apparatus to give predetermined temperature distribution over the areas of the article requiring heating.

DISCLOSURE OF INVENTION

Broadly a high frequency induction heating apparatus constructed according to the invention comprises a heating station having transport means for moving an article through the heating station. A pair of high frequency electrical conductors extend in a plane beneath and parallel to the path of movement of the article through the station. The electrical conductors are connected to a source of high frequency electrical current such that the current will flow through the conductors in mutually opposite directions. In order to insure even heating of the article, each conductor is inclined with respect to the path of movement of the article through the heating station so that as the article moves through the station, the heating zone formed by the conductors will gradually move across the complete area of the article facing the conductors to insure even heating and even temperature distribution of the article. In some instances the degree of inclination or taper of the conductors with respect to the path of the movement of the article may vary along the path in order to vary temperature rise characteristics of the surface of the article facing the conductors and also to accommodate varying shapes of the article to be heated in order to insure uniform heating of the surface facing the conductor.

The invention also contemplates positioning ferrite cores along the path of movement on the sides of the conductors opposite the article to be heated in order to increase heating at those portions where the cores are situated.

Further it is contemplated to utilize a guide plate which is spaced from and extends parallel to the path of movement such that an article to be heated may pass between the plate and conductors. The guide plate serves to limit any movement of the article to be heated away from the conductors due to any repulsion effect arising between the conductors and the article as occurs when the object to be heated is made from a non-magnetic material, such as aluminum and a current flow is induced in the article.

BEST MODE FOR CARRYING OUT THE INVENTION

Figure 1:
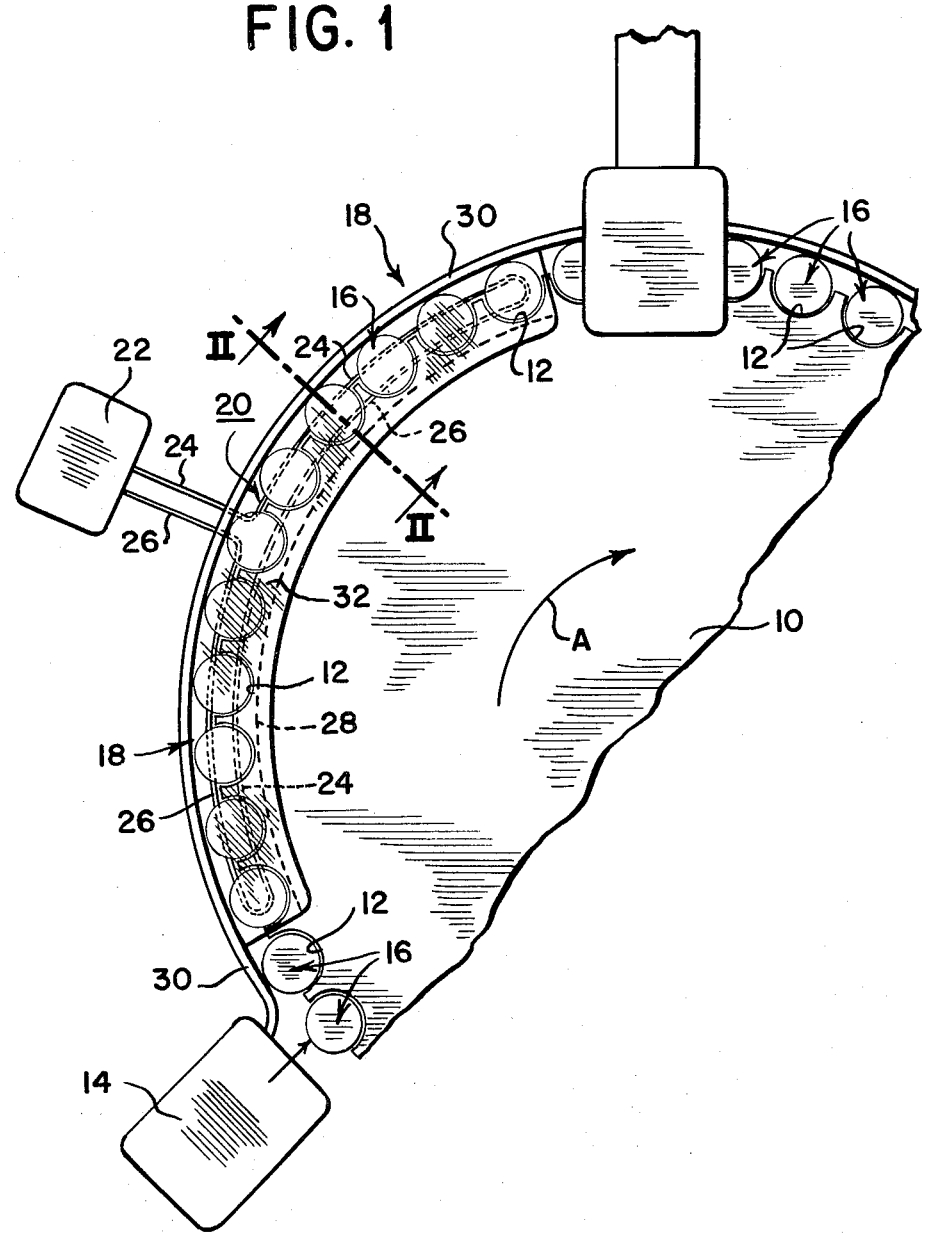
FIG. 1 is a partial plan view of a high frequency induction heating apparatus constructed according to the invention.

Referring to FIG. 1 there is illustrated a high frequency induction heating apparatus constructed according to the invention having a transport means in the form of a turntable 10 having a plurality of semi-circular notches 12 placed at equal intervals on the periphery thereof. Metal shells 16 are supplied to the table by way of a chute 14 such that the bottom sides of the shells face down and are inserted one each into a notch 12. The shells 16 are then moved in the direction of the arrow A by the turntable 10 through a heating station 18 where they are heated to a desired temperature, for example 100°-200° C. by the high frequency conductors 24 and 26 which extend in a plane spaced from and parallel to the path of movement of the shells 16 through the heating station.

The conductors 24 and 26 are connected to a high frequency power source 22 such that the conductors 24 and 26 form one turn of a heating coil 20 contained in the heating station. The conductors 24 and 26 are connected to the high frequency source such that the current passing through the conductors is in mutually opposite directions.

Figure 2:
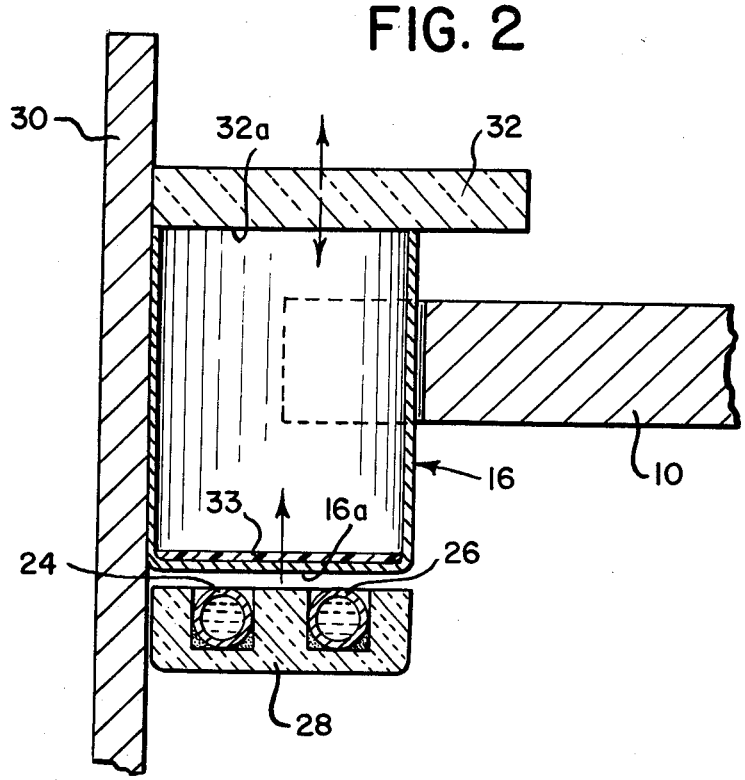
FIG. 2 is an enlarged sectional view of FIG. 1 taken along lines II—II.

Referring to FIG. 2, the conductors 24 and 26 forming the high frequency induction heating coil 20 are shown embedded in an arc-shaped coil base plate 28 made from a silicon resin or Bakelite where the base is positioned beneath the outer peripheral surface of the turntable. Each shell 16 is guided along the circular path of movement through the heating station by way of a guide wall 30 positioned near the outer periphery of the turntable 10. A further guide plate 32 extends above the path of movement of the shell 16 and is also positioned adjacent the outer periphery of the turntable.

Magnetic material such as tin plate or tin free steel has been used in the past in the manufacture of metal caps. In recent years, however, non-magnetic material such as aluminum, aluminum alloys, copper or brass have been utilized in the manufacture of the metal shell portions of the caps. Shells made of non-magnetic material tend to float and jump from the transport means comprising the turntable 10 because of the repulsion effect existing between the magnetic field of the high frequency heating coil and the current induced in the bottom of the shell being heated with the result that the shell is not sufficiently heated.

However with the inclusion of guide plate 32, the open surface of the shell strikes against the facing surface 32a of the guide plate to limit movement of the bottom surface of the shell away from the conductors. The open surface then slides along the surface 32a as the shell is moved by the transport means 10. Maintaining the bottom surface 16a of the shell at a predetermined distance from the conductors 24 and 26 insures that the bottom of the shell will be induction heated to a required amount. As a result, adhesive primer 33 at the bottom of the shell will be sufficiently heated to assure that any resin sheet applied thereto later in the manufacturing process will adhere thereto.

Guide plate 32 is vertically adjustable in order that the spacing between the heating station 18 and the facing surface 32a of the guide plate may be freely adjusted to accommodate shells of varying size, particularly those having varying heights, to insure that the bottom 16a of the shell will always be positioned correctly with respect to the conductors 24 and 26. As the shell strikes against the guide plate 32, it is necessary that the guide plate be of sufficient strength to withstand the impact and it is also necessary that the surface 32a be smooth and flat in order that the open end of the shells may easily slide thereover. A guide plate made from a strengthened glass plate having a thickness of 5-10 millimeters meets these conditions and in addition allows viewing of the shells as they pass through the heating station.

Figure 3:
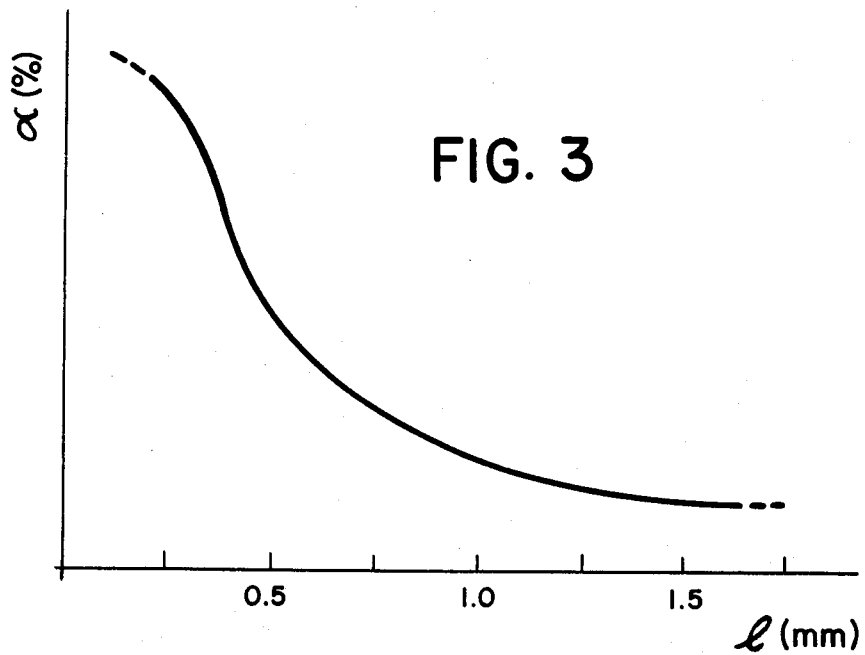
FIG. 3 is a graph illustrating percentage of temperature rise of an article to be heated as a function of distance of the article from the current conductors.

As shown in FIG. 3, the distance between the electrical conductors and the article being heated should be as small as possible to insure exact heating when the article comprises a non-magnetic material such as an aluminum shell. As shown, the percentage of temperature rise alpha on the shell bottom 16a plotted against the interval "1" between the upper ends of the conductors and the shell bottom 16a should be on the order of 1 millimeter maximum and preferably 0.5 millimeters maximum to assure effective heating.

Figure 4:
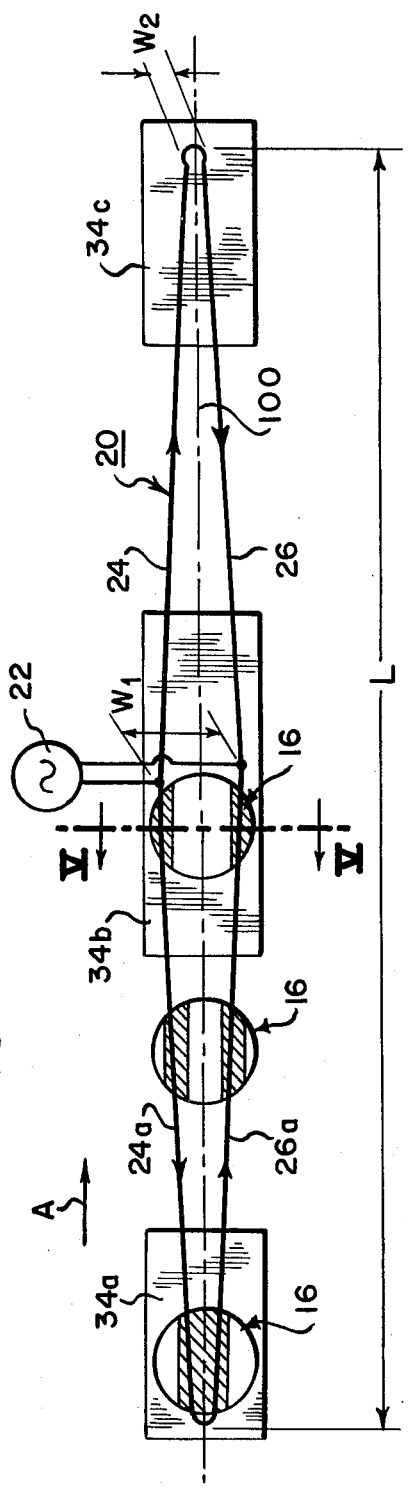
FIG. 4 is a diagrammatical view illustrating the path of movement of an article to be heated relative to a first positioning of conductors as applied to the apparatus of FIG. 1 and illustrating placement of ferrite cores along the path of movement.

As shown in FIG. 1 and as further exemplified in FIG. 4, the current conductors 24 and 26 of the heating coil 20 are inclined or tapered with respect to the path of movement of the article being heated through the heating station. As shown in FIG. 4, the arc-shaped heating coil 20 of FIG. 1 is illustrated for purposes of clarity as extending linearly along the path of movement 100 of the shell 16 and with the conductors 24 and 26 being inclined or tapered with respect to the path. The interval between the conductors increases from the entry end of the heating station in the direction A towards the source of the high frequency power source 22 and then decreases towards the exit end of the station. The high frequency current from the source 22 is shunted by outflow conductors 24 and 24a and then passes through the inflow conductors 26 and 26a to return to the power source. When the phase of the high frequency power source is inverted, the respective current paths in the conductors are likewise inverted.

In FIG. 4, the two groups of outflow and inflow current conductors are designed for impedence matching with high frequency power source 22. It also would be possible however to have a plurality of turns of the outflow and inflow electrical conductors, and, by proper selection of current characteristics to provide the impedance matching with source 22.

Since the conductors 24 and 24a and 26 and 26a are inclined with respect to the path of movement 100, the bottom of the shell 16 or article will be heated in successive areas as it moves along the path, as indicated by the cross hatching until the complete bottom area is heated. As shown, the area heated at any point along the path is comparatively larger than the diameter of the conductors themselves. Thus as the shell moves through the heating station, the center area of the shell bottom will be heated initially with the heated areas gradually moving toward the periphery of the shell until the shell reaches the mid-point of the heating station adjacent the power source 22, and then the heated areas will gradually move towards the center of the shell after which the entire bottom surface of the shell will be nearly uniformly heated. The shell is then ready for delivery to a further processing station where the sealing sheet may be applied.

Figure 5:
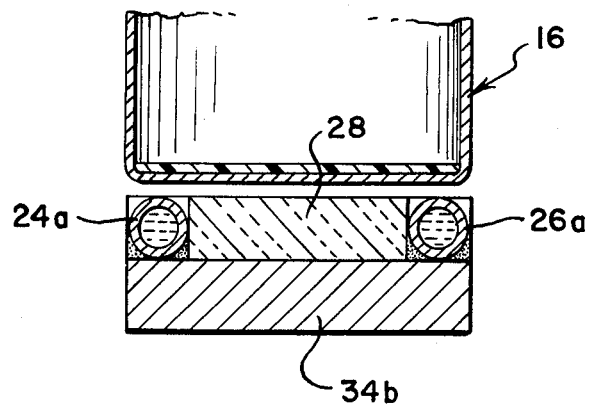
FIG. 5 is an enlarged sectional view of FIG. 4 taken alone lines V—V.

When the article to be heated is in the form of a disc such as a bottom of a metal shell and where the conductors are inclined to the path of movement, the center and outer parts of the shell become more difficult to heat than intermediate parts such that non-uniform temperature distribution of the bottom part of the shell may occur. In order to prevent this, ferrite cores 34a, 34b and 34c are positioned beneath the conductors on the opposite side of the conductors from the article to be heated at the center and ends of the path of movement through the heating station as shown in FIGS. 4 and 5. This improves heating efficiency to increase heating of the central and peripheral parts of the disc with the result that the entire disc has a substantially uniform temperature distribution. While the ferrite cores in FIG. 4 are shown positioned at the entry, center and exit ends of the heating station, it is obvious that they may be positioned at any portion of the path of movement where increased heating is desired.

Figure 6:
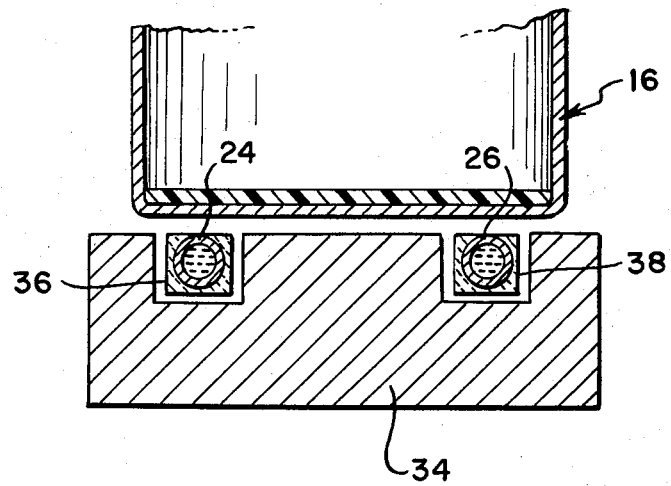
FIG. 6 is an enlarged sectional view similar to FIG. 5 of a further embodiment of the invention.

Referring to FIG. 6 a further embodiment of the invention is disclosed wherein the conductors 24 and 26 are enclosed in a ferrite core 34 by insertion into the cavities 36 and 38. As a result, the degree of electromagnetic flux concentration from the conductors 24 and 26 is increased such that the strength of the electromagnetic coupling between the shell 16 and the current conductors 24 and 26 is increased.

Figure 7:
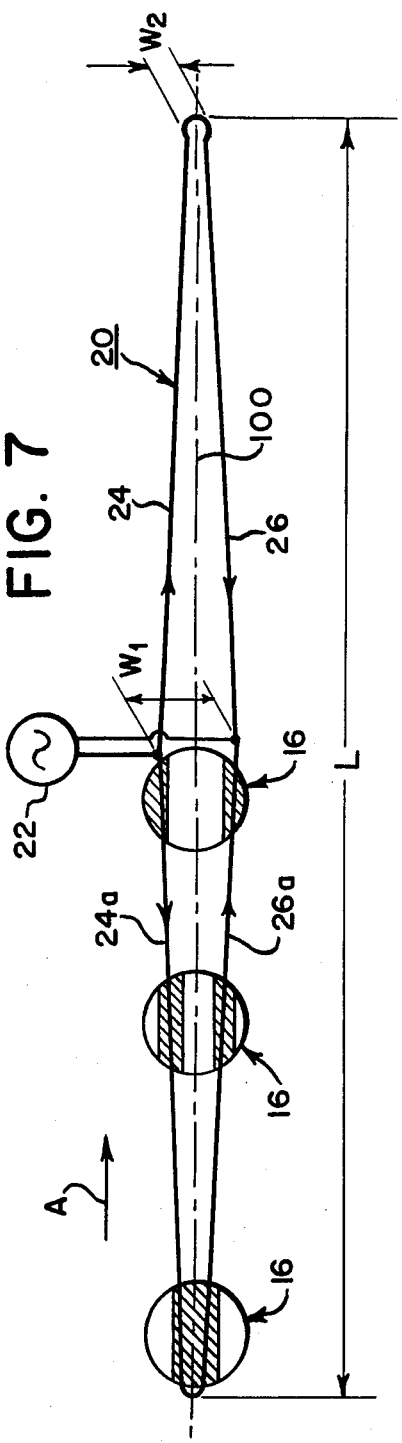
FIG. 7 is a view similar to FIG. 4 without the inclusion of ferrite cores.

FIG. 7 discloses a further form of the invention but without the inclusion of the ferrite cores as illustrated in FIG. 4. A typical heating apparatus using the arrangement of FIG. 7 would be such that the length "L" of the heating station would be on the order of 1 meter. The width W1 between the conductors 24 and 26 at the center of the heating station is on the order of 30 millimeters and the width W2 between the conductors at the exit and entry end of the station is on the order of 10 millimeters. The maximum diameter of the conductors is 38 millimeters and the transport speed of the article being heated is on the order of 0.8 meters per second with the article being in the heating station for a period of 1.25 seconds. It has been found that the temperature deviation of the article as produced by an arrangement of conductors as illustrated in FIG. 7 is on the order of 10% immediately after passage of the article through the heating station, whereas in prior art constructions, utilizing parallel extending conductors, the temperature deviation of the article is on the order of 40%.

Figure 8:
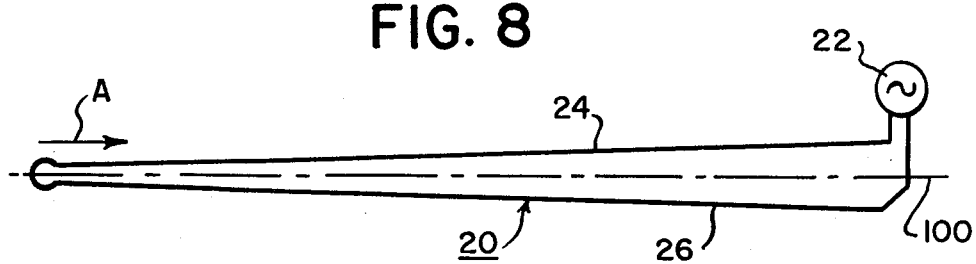
FIG. 8 is a view illustrating a second positioning of conductors in an apparatus of the type of FIG. 1.

FIG. 8 illustrates a conductor arrangement whereby the conductors are inclined uniformly along the entire length of the path of movement of an article through a heating station and where the distance between the conductors increases from the entry end of the station to the exit end. This arrangement is particularly adaptable where the outer periphery of the article tends to cool more quickly than the center part of the article.

Figure 9:
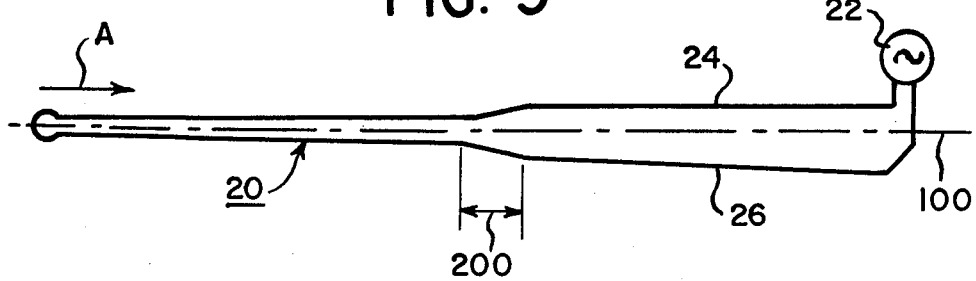
FIG. 9 is a view similar to FIG. 8 showing a third positioning of conductors.

FIG. 9 illustrates a further form of conductor arrangement but where the degree of inclination or taper varies along the path of movement of the article through the heating station. As shown, the zone or portion 200 has a greater degree of inclination or taper gradient than other portions and consequently the article being heated, when transported at a fixed speed in the direction of the arrow A, will receive less heat in the intermediate areas of the bottom of the article between the center and the periphery which corresponds to that area of the article overlying the conductors when passing through the zone 200. In the case of metal shells comprising aluminum, the temperature rise in the intermediate areas of the cap between the center and outer periphery is more pronounced when using a uniform inclination or taper such that the conductor configuration of FIG. 9 is well suited to provide uniform heating of the aluminum cap as it reduces heating of the intermediate area.

Figure 10:
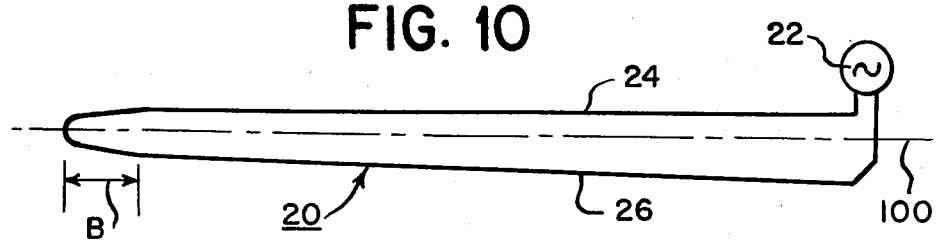
FIG. 10 is a view similar to FIG. 8 showing a fourth positioning of conductors.

FIG. 10 discloses a conductor arrangement providing an abrupt inclination or taper gradient at the zone or portion B at the start of the path located at the entry of the heating station. This arrangement is particularly adaptable for providing greater heating to the periphery of the article than to the center.

Figure 11:
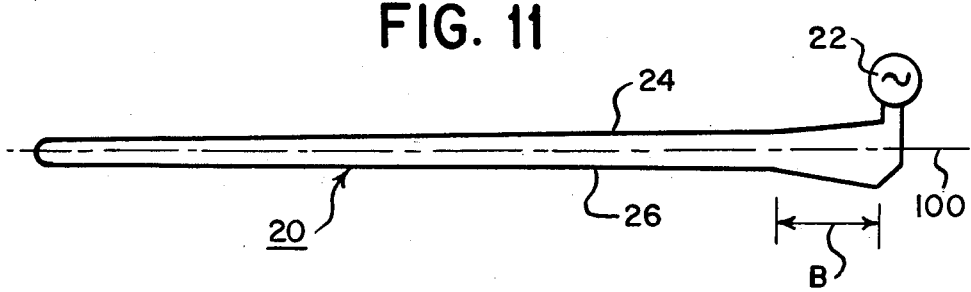
FIG. 11 is a view similar to FIG. 8 showing a fifth positioning of conductors.

FIG. 11 shows a still further form of conductor arrangement where the large inclination or tapered gradient zone B is located near the end of the path located at the exit end of the heating station. This arrangement is suited for imparting larger heating energy to the center of the article than to the periphery.

As shown in FIGS. 4, 7 and 8-11, the conductors are positioned symmetrically with respect to the path of the article through the length of the heating station formed by the heating coil 20. Also as shown in these Figures, the conductors 24 and 26 making up the heating coil are inclined at constant angles throughout portions of the path of movement of the article, that is to say, the conductors extend in straight lines in different portions of the path of movement.

While each of the arrangements shown in the drawings show the conductors inclined or tapered along the entire length of the path of movement of the article, it is obvious that portions of the conductors could be parallel to the movement of the article through the heating station.

The high frequency power source 22 can be either a vacuum tube oscillator or a transistor oscillator, and while the description has been primarily concerned with articles made of a non-magnetic material, it is obvious that the apparatus would be applicable for heating of articles made from magnetic material, for example iron.

A heating apparatus as disclosed is applicable for the uniform heating of the bottom of articles to produce uniform temperature distribution, or if desired, any part of the bottom of the article may be heated to a different temperature to give a non-uniform temperature distribution over the bottom of the article.

I claim:

1. In a high frequency induction heating apparatus having a heating station, a transport means for moving a non-magnetic metal article to be heated along a path through said heating station, a pair of high frequency electrical conductors in said heating station extending in a plane below and parallel to the path of movement of said article through said station, and a source of high frequency electrical current connected to said conductors whereby high frequency electrical current will flow through said conductors in mutually opposite directions; the improvement comprising in that said conductors are symmetrically positioned with respect to said path of movement through the length of said station, in that each said conductor extends in a direction which is uniformly inclined at a constant angle to a portion of the path of movement of said article through said heating station, and in having a guide plate in a plane spaced above said conductors and parallel to said path of movement of said article through said heating station to form an unobstructed space through which said article may move with said plate being adapted to limit movement of the article away from said conductors due to any repulsion effect between said article and said conductors when high frequency current flows through said conductors.

2. In a high frequency induction heating apparatus according to claim 1 having in addition a ferrite core positioned on the opposite side of the electrical conductors from the article to be heated along a portion of said path through said heating station.

3. In a high frequency induction heating apparatus according to claim 1 wherein each high frequency conductor extends in a direction which is uniformly inclined at the same angle to said path of movement of said article through the length of said heating station.

4. In a high frequency induction heating apparatus according to claim 1 wherein each high frequency conductor extends in a direction where the angle of inclination that the conductor makes with said path varies along different portions of said path of said article through said heating station.

* * * * *